United States Patent Office 3,046,475
Patented July 24, 1962

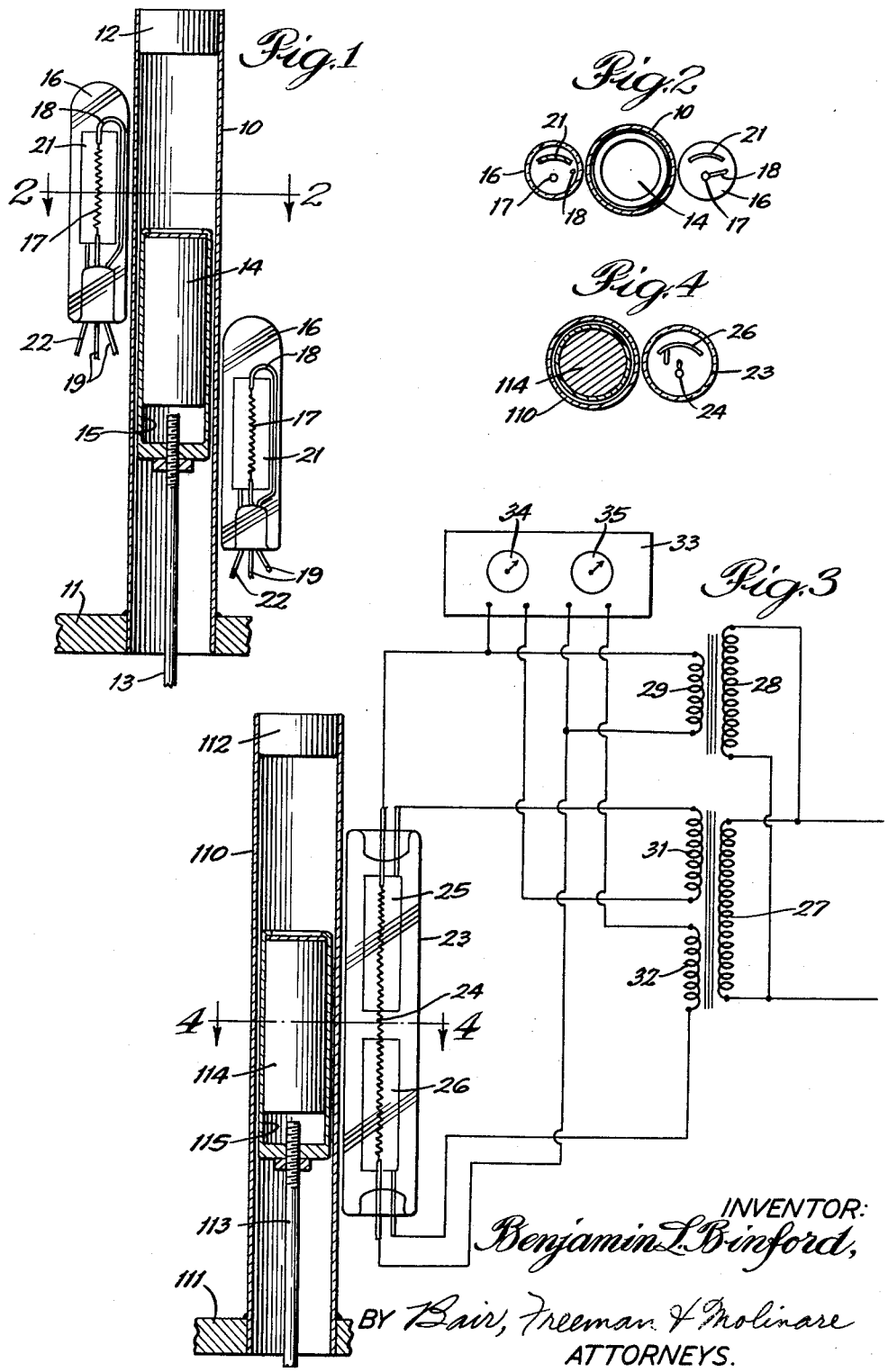

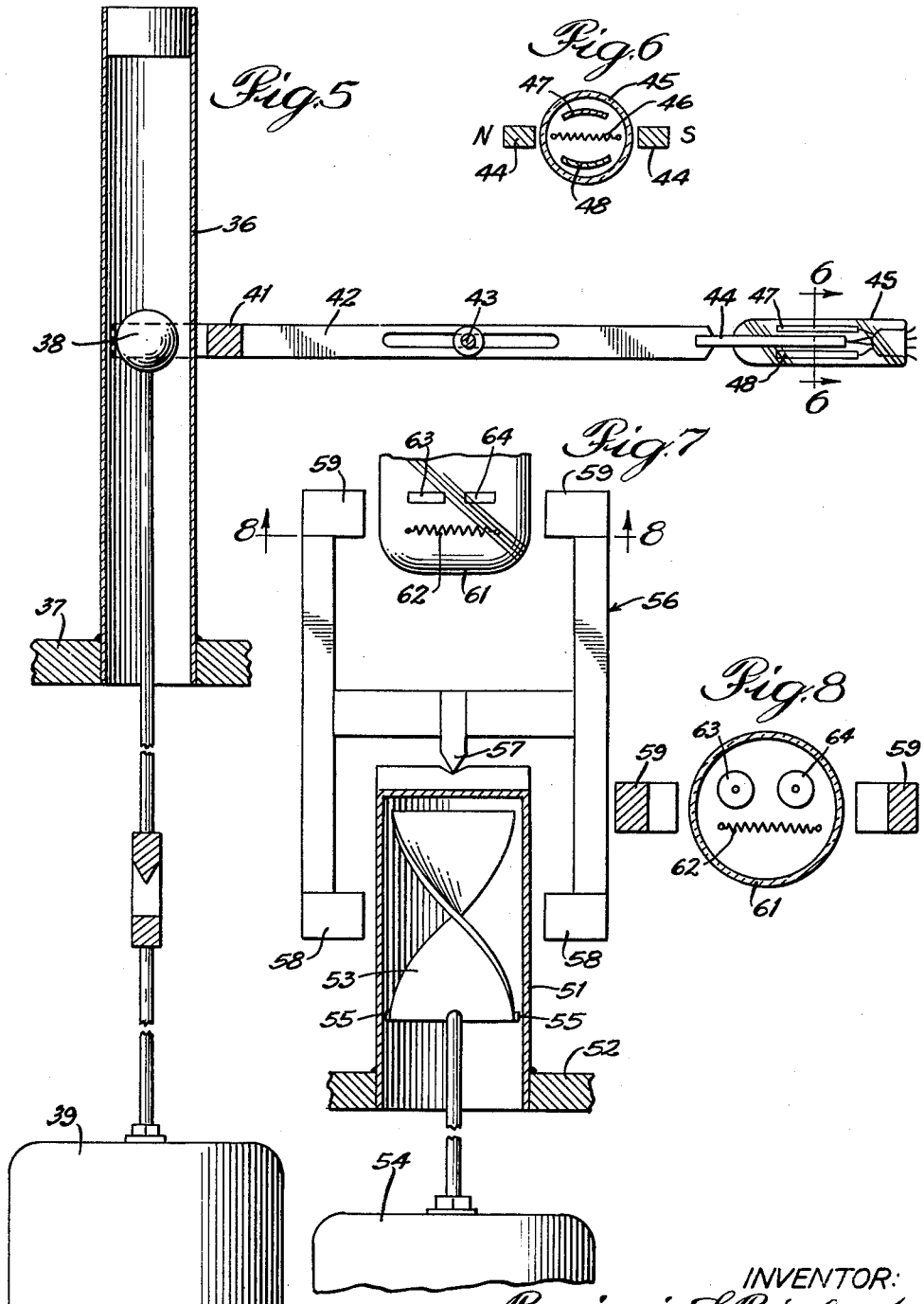

3,046,475
MAGNETIC MEASURING APPARATUS
Benjamin L. Binford, Elmwood Park, Ill., assignor to Magnetrol, Inc., Chicago, Ill., a corporation of Illinois
Filed May 19, 1958, Ser. No. 736,290
2 Claims. (Cl. 324—44)

This invention relates to magnetic measuring apparatus and more particularly to apparatus operated by movement of a magnetic element to detect changes in a physical condition.

It has heretofore been proposed to detect movement of a magnetic element which is moved in response to changes in a condition by causing mechanical movement of a detecting or indicating device, such as an electric switch, which is magnetically coupled to the moving element. The present invention relates to devices of this general type and has for its principal object the provision of magnetic measuring apparatus in which movement of a magnetic element is detected or indicated electronically.

Another object is to provide measuring apparatus in which a movable magnetic element shifts the magnetic field relative to spaced electrodes to vary the flow of space current between the electrodes.

According to a feature of the invention a magnet is moved along a linear path in response to changes in a condition to be measured and a plurality of pairs of spaced electrodes are mounted adjacent said path to have the relative current flow therebetween varied by variations in the magnetic fields between the electrodes.

In another desirable construction magnetic elements are rotated to produce a rotating magnetic field and pairs of electrodes are eccentrically spaced in the field to produce different space currents therebetween in different angular positions of the field.

According to another feature of the invention, magnets are supported on a rotatable frame on opposite sides of the path of a longitudinally movable spirally twisted magnetic element which is moved in response to changes in the condition to be measured to rotate the frame.

The above and other objects and features of the invention will be more readily apparent from the following description when read in connection with the following drawings, in which:

FIGURE 1 is a sectional view through one form of the apparatus embodying the invention;

FIGURE 2 is a section on the line 2—2 of FIGURE 1;

FIGURE 3 is a view similar to FIGURE 1 of an alternative form of apparatus and showing a detecting circuit;

FIGURE 4 is a section on the line 4—4 of FIGURE 3;

FIGURE 5 is a view partly in section of another form of apparatus embodying the invention;

FIGURE 6 is a section on the line 6—6 of FIGURE 5;

FIGURE 7 is a view with parts in section of still another form of apparatus embodying the invention; and FIGURE 8 is a section on the line 8—8 of FIGURE 7.

The apparatus in any of the several forms illustrated may be utilized to detect changes in a physical condition, such as liquid level, flow, pressure, or the like, and to operate indicating or control means in response to such changes. As shown in FIGURE 1, the apparatus may comprise a tube 10 of non-magnetic material, such as brass, sealed at its lower end in the top of a container partially illustrated at 11 and closed at its upper end by a plug or the like 12. The container 11 may, for example, contain a liquid whose level is to be measured and may have a float or displacer therein which will move vertically in response to changes in the level. The float or displacer is connected through a rod 13 with a magnet 14 which may be enclosed in a shell 15 secured to the rod 13 and movable vertically in the tube 10 as the liquid level changes.

To detect movement of the magnet, according to the present invention, one or more pairs of spaced electrodes are mounted adjacent to the tube 10 to be subjected to varying magnetic fields as the magnet moves close to or away from the different pairs of electrodes. As shown, there are two sealed envelopes 16 of glass, or the like, mounted adjacent to the tube 10 at different positions along the length thereof. Each tube contains a filament 17 secured between a binding post 18 and terminals 19 projecting through the end of the envelope to be heated by flow of current therethrough. Each envelope also contains an anode 21 in the form of a curved plate, as best seen in FIGURE 2 spaced from the filament. The anode is connected to a terminal 22 projecting from the end of the envelope for connection in an indicating or controlling circuit.

The tubes are preferably arranged, as shown in FIGURE 2, with a line between the filaments and plates thereof perpendicular to a diameter through the tube 10 intersecting the center portions of the tubes. With this construction, as the magnet 14 is moved up and down in the tube 10 it will move into and out of registration with the pairs of electrodes 17 and 21 to vary the magnetic fields between the electrodes of the different pairs. With the magnet in a centered position, substantially as shown in FIGURE 1, the pairs of electrodes will be subjected to equal magnetic fields which will be extremely weak due to the fact that the magnet is spaced relatively far from the electrodes so that there will be equal and relatively large current flow between the filament and anode of each pair. If the magnet is moved upwardly by a high level of liquid in the container, for example, the magnetic field between the upper pair of electrodes 17 and 21 will increase while the magnetic field between the lower pair of electrodes will decrease. By making the electrodes relatively short in the direction of movement of the magnet, a relatively sharp cut off can be obtained while if the electrodes are made relatively long a proportional variation in current flow therebetween can be obtained. Variations in current flow between the electrodes may be utilized as a signal for indication, alarm, or control purposes, as desired. Similarly, if the level in the container 11 falls, the magnet will move down into registry with the lower pair of electrodes 17 and 21 to reduce the current flow therebetween to indicate a low level.

FIGURE 3 illustrates a modified construction, parts therein corresponding to like parts in FIGURES 1 and 2 being indicated by the same reference numerals, plus 100. This construction, as shown, is identical to that of FIGURES 1 and 2, except that the two separate envelopes are replaced by a single envelope 23 formed of glass, or the like, containing a single elongated filament 24 and a pair of longitudinally spaced anode plates 25 and 26. Terminals may project through opposite ends in the envelope to connect the filament to a source of power and to connect the anodes to indicating or control circuits. This construction will function in the same general manner as that of FIGURES 1 and 2 with the current flow between the filament and the respective anodes being varied as the magnet 114 moves up or down to give an indication of its position and of the condition which effects its movement.

FIGURE 3 also illustrates a typical indicating or control circuit responsive to the flow of current between the filament and the respective anodes. As shown, this circuit comprises a transformer having primary windings 27 and 28 connected across a suitable source of alternating current and having secondary windings 29, 31 and 32. The secondary winding 29 comprises the power supply for the filament and may be connected directly across the filament, as shown. The windings 31 and 32 comprise voltage sources for the anodes 25 and 26, respectively, and for this purpose one end of each winding is connected to one of the anodes. The opposite ends of the windings 31 and 32 and the opposite ends of the filament 24 may be connected to an indicating or control instrument 33, including indicating or control mechanisms designated generally as dials 34 and 35 which are connected respectively between the other ends of the windings 31 and 32 and the ends of the filament. The indicating or control devices are thus responsive to the flow of space current between the filament 24 and the respective anodes 25 and 26 to indicate the position of the magnet 114 or to effect a control operation in response to movement of the magnet.

FIGURES 5 and 6 illustrate a further alternative construction comprising a tube 36 of nonmagnetic material secured to the upper end of a tank or container 37 and containing a magnet or magnetic armature 38 for longitudinal movement therein. The magnetic element 38 may be moved by a float or displacer 39 in response to a liquid level or other condition to be measured. The magnetic element 38 is magnetically coupled to a U-shaped magnet which spans the tube 36 so that the magnet 41 will follow the position of the magnetic element 38. The magnet 41 is carried by one end of a lever 42 pivoted intermediate its ends on a pivot 43 which is preferably adjustable along the length of the lever to adjust the range of the device. At its opposite end the lever carries a U-shaped magnet 44 whose opposite legs span the end of a sealed envelope 45 formed of glass or the like.

As best seen in FIGURE 6, the envelope 45 contains a central filament 46 and a pair of anode plates 47 and 48 lying on opposite sides of the filament and on opposite sides of a line joining the arms of the magnet 44, as seen in FIGURE 6.

When the lever 42 is in a centered position, as shown, the magnet 44 will be exactly centered between the plates 47 and 48 so that the magnetic field cutting the space paths between the filament 46 and the plates 47 and 48, respectively, will be equal. As the lever is moved by movement of the magnetic element 38 the magnetic field between the filament 46 and one of the plates 47 or 48 will be increased while the field between the filament and the other plate is decreased. Thus the current flow in one space path will increase simultaneously with decrease of current flow in the other space path to indicate the position of the magnetic element 38 or to effect a controlling operation in response to movement thereof. The filament 46 and the plates 47 and 48 may be connected in a detecting circuit similar to that shown in FIGURE 3.

FIGURES 7 and 8 illustrate a further alternative construction including a non-magnetic tube 51 secured to the top of a tank or container 52 and having a spirally twisted member 53 of magnetic material shiftable longitudinally therein. The member 53 may be moved lengthwise by a float or displacer 54 and may be held against turning in the tube 51 by lugs 55 on the element 53 engaging slots or grooves in the tube 51. An H-shaped frame indicated generally at 56 is mounted for rotation coaxially with the tube 51 and is adapted to be turned in response to longitudinal movement of the element 53. As shown, the cross bar of the frame carries a pivot pin 57 which supports the frame for rotation above and coaxially with the tube 51. The lower arms of the frame span the tube 51 and carry magnets 58 which are arranged with their opposite poles facing to be magnetically coupled to the element 53. Alternatively the entire frame 56 may be formed of magnetic material and magnetized to produce the same result. With this construction the magnets 58 will tend to follow the edge portions of the spirally twisted element 53 so that as the magnetic element moves vertically in the tube the frame will be turned proportionately to movement of the magnetic element.

At its upper end the frame carries magnets 59 arranged with unlike poles facing to produce a substantially straight line magnetic field. A sealed envelope 61 is mounted between the magnets 59 and contains a filament 62 and a pair of anodes 63 and 64 which are spaced from each other on the same side of the filament, as best seen in FIGURE 8, and which may also be spaced longitudinally of the tube from the filament, as seen in FIGURE 7.

When the magnetic element 53 is in its neutral or zero position, the magnets 59 will be positioned, as shown in FIGURE 8, so that the magnetic field between them passes between both of the anodes and the filament parallel to a line joining the anodes. Thus the magnetic fields cutting the space paths between the respective anodes and the filament will be equal and the current flows through the space paths will be equal. As the frame is turned, the magnets 59 will turn around the envelope 61 so that the magnetic field between them is centered to a greater extent in one of the space paths than in the other. This will produce a difference in the flow of currents in the two space paths which can be utilized through a detecting circuit, such as that shown in FIGURE 3, to sense the position of the magnetic element 53 and to effect an indicating or control operation in response to its movement.

While several embodiments of the invention have been shown and described herein, it will be understood that they are illustrative only and not to be taken as a definition of the scope of the invention, reference being had for this purpose to the appended claims.

What is claimed is:

1. Magnetic measuring apparatus comprising a magnet mounted for lineal movement along a straight path, means responsive to a condition to be measured to move the magnet along said path, an elongated sealed envelope adjacent and parallel to said path, a plurality of pairs of electrodes in the envelope spaced lengthwise thereof, and detecting means connected in circuit with each pair of electrodes, movement of the magnet varying the relative flux intensity in the space paths between the electrodes of different pairs.

2. The apparatus of claim 1 in which the electrodes of each pair are elongated in a direction parallel to said straight path whereby the flux intensity therebetween will be varied progressively along the length thereof as the magnet moves.

References Cited in the file of this patent
UNITED STATES PATENTS

| | | |
|---|---|---|
| 1,040,127 | Bonesteel | Oct. 1, 1912 |
| 2,326,677 | Perelmann | Aug. 10, 1940 |
| 2,358,901 | Ziebolz | Sept. 26, 1944 |
| 2,383,757 | Ziebolz | Aug. 28, 1945 |
| 2,437,374 | Burroughs | Mar. 9, 1948 |
| 2,528,437 | Joy | Oct. 31, 1950 |